United States Patent Office 3,849,387
Patented Nov. 19, 1974

3,849,387
PROCESS OF FORMING POLYOLEFIN FIBERS
Robert W. Fowells, 603 K St., Washougal, Wash. 98671;
Robert A. Damon, 1119 SE. 78th Ave. Vancouver,
Wash. 98664; and James G. Coma, 200 NW. 78th St.
Vancouver, Wash. 98665
Continuation-in-part of abandoned application Ser. No.
27,053, Apr. 9, 1970. This application Mar. 16, 1972,
Ser. No. 235,420
Int. Cl. C08f 3/06, 3/10, 15/04
U.S. Cl. 260—94.9 B                  17 Claims

ABSTRACT OF THE DISCLOSURE

The process of forming polyolefin fibers, comprising forming a fibrous gel containing polyolefin microfibrils, macrofibrils and fibers, and mechanically refining the gel to liberate and/or form polyolefin fibers.

---

This application is a continuation-in-part of S.N. 27,053, filed Apr. 9, 1970, now abandoned.

BACKGROUND OF THE INVENTION

The polymerization of olefins into polyolefins is well established in the art. Early processes employed the high pressure procedure to produce low density polyethylene. More recently, the use of coordination catalysts has permitted the polymerization of olefins to be effected at lower pressures to produce high density polyolefins.

The formation of fibers or filaments of polyolefins has previously been effected by extruding the polyolefin through spinnerets with the formation of continuous filament lengths, with subsequent chopping of such filaments into staple fibers.

Another approach has been to form so-called "fibrids." The formation of such fibrids is described in U.S. Pats. 2,999,788, 2,988,782 and 2,708,617.

All of these prior art processes require the formation of the polymeric material first, with subsequent conversion into fibers. The first of the prior art processes mentioned involves the general steps of polymerizing the monomer to the polymer, precipitating the polymer as a crumb from the reaction medium, forming the precipitated polymer into pellets, heating the pellets and extruding them through spinnerets to form filaments, and chopping the filaments into staple. The second type of prior art process (fibrids) involves forming the polymer and redissolving the polymer to precipitate it in the form of fibrids. As is seen by the number of steps involved, such processes are relatively expensive in view of the large number of intermediate handling steps. In addition, there is a practical upper limit on the molecular weight of the polymer employed in such prior art processes because of viscosity limitations.

A process has recently been invented whereby polyolefin fibers may, surprisingly, be formed directly from olefin monomers during polymerization. This process is described in copending application Ser. No. 874,687, filed Nov. 6, 1969, now abandoned (which is a continuation-in-part of U.S. Ser. No. 769,501, filed Oct. 22, 1968, now abandoned). In the process described in the aforementioned application, olefins are polymerized in a suitable reaction medium in the presence of a coordination catalyst at a relatively high reaction rate and under conditions of relatively high shear stress to produce fibers directly which have a gross morphology and size similar to natural fibers. Such fibers will be referred to hereinafter as "nascent fibers." The nascent fibers thus manufacture are made up of "macrofibrils" which generally have a diameter greater than about 1 micron.

SUMMARY OF THE PRESENT INVENTION

The present process forms linear polyolefin fibers of the type described in the aforementioned copending application Ser. No. 874,687, by first forming a fibrous gel containing relatively high molecular weight linear polyolefin microfibrils, macrofibrils and fibers, and refining the gel to liberate and/or form polyolefin fibers.

DESCRIPTION OF PREFERRED EMBODIMENTS

When the olefin polymerization reaction is carried out under the conditions discussed herein, a fibrous gel material is obtained. "Fibrous" gel is defined as a fibriller structure of fibrous linear polyolefin having interconnecting capillary spaces filled with the reaction medium.

By "brous" linear polyolefin, it is intended to include both microfibrous polyolefin and macrofibrous linear polyolefin, as well as fibers. Generally, therefore, the polymer in the gel is in the form of microfibrils, macrofibrils, fibers and/or lamellae, and the proportion of these is dependent upon the history of the gel. Microfibrils may be obtained independent of any shear stress being imposed upon the reaction medium; however, the employment of shear stress in the medium tends to align the microfibrils into macrofibrils and fibers, and it is preferred to operate the process so as to form such macrofibrils and fibers. As previously mentioned, by "macrofibrils" it is intended to mean microscopic fibers having a diameter greater than about 1 micron up to about 20 microns, and microfibrils are microscopic fibers having a diameter less than about 1.0 micron. "Fibers," in the sense employed herein, have a diameter ranging upward from about 10 microns.

The fibrous gel of the present invention is made up of about 0.5 to 50% by weight and preferably about 3–30% by weight of the polyolefin, with the remainder being the reaction medium, minor amounts of catalyst and whatever is employed to stop the polymerization reaction, such as ethyl or isopropyl alcohol.

Wherever polyolefin polymer is referred to herein as being "crumb," it is intended to mean non-fibrous polyolefin particles.

Olefinic monomers which may be polymerized to form the fibrous gel of the present invention are any of these which can be polymerized by the employment of a coordination type catalyst.

The preferred monomers are the moolefins, ethylene and propylene. Other olefins which may be employed are diolefins such as butadiene and isoprene; aliphatic alpha olefins having a maximum of 18 carbon atoms preferably from 2 to 6 carbon atoms per molecule such as 1-butene, 1-pentene, 1-dodecene and 4-methyl, pentene-1; cycloalkyl and aryl substituted olefins such as vinyl cyclohexane and styrene. In addition to forming fibrous homopolymers of the foregoing olefins, fibrous copolymers and block copolymers may be formed by the employment of mixtures of the foregoing olefins.

Any of those coordination type or stereospecific catalyst systems employed in the art for the polymerization of olefinic monomers may be employed in the process of the present invention. Especially preferred are the Ziegler type coordination catalyst systems, which are generally a combination of a catalyst and a co-catalyst. The catalyst is a compound (usually an oxide or halide) of a transition metal from groups IVB–VIIIB and group VIII of the periodic chart, and the co-catalyst is a metal alkyl where the metal is from groups IA, IIA, IIB or IIIA of the periodic chart. The periodic table referred to is that in "Handbook of Chemistry," by Lange, seventh edition, pp. 58–59. Any conventional Ziegler type catalyst system, such as those described in Belgian Patents 533,362; 534,-792; and 534,888, may be employed in the present process. Three component Ziegler type catalysts may also be employed, and appear to have special utility where propylene is the olefinic monomer.

The preferred Ziegler catalysts and co-catalysts for polymerizing ethylene are as follows: preferred catalysts, in order of increasing activity in fiber formation, are titanium trichloride, titanium tetrachloride, vanadium tetrachloride and vanadium oxytrichloride; preferred co-catalysts, in order of increasing activity, are dialkyl aluminum halides such as diethyl aluminum chloride and trialkyl compounds such as triethyl aluminum.

The ratio of co-catalysts to catalysts (i.e. aluminum: titanium or aluminum: vanadium) employed is preferably in the range of 1:1 and 3:1, although ratios as low as about 0.4:1 and as high as 50:1 or higher (with vanadium catalysts) are employable.

The preferred coordination catalyst systems and ratios for polypropylene and other olefinic monomers are those generally recognized in the art to give high reaction rates.

The catalyst concentration employed in the reaction medium is not per se critical to gel formation, the important thing being that sufficient monomer is presented to the polymer propagation sites on the catalyst to insure a relatively rapid rate of polymer formation. More specifically, it is necessary that the rate of reaction per active catalyst site is high. The amount of monomer transported to such catalytic sites depends upon numerous factors such as temperature, degree of agitation of the reaction mass and monomer concentration, which in the case of gaseous monomers is dependent on the partial pressure of monomer in the system. Where the degree of agitation is relatively low or no agitation is employed, and the pressures employed are atmospheric or relatively low superatmospheric pressures, it may be necessary to lower the catalyst concentration in the reaction medium in order to increase the rate of reaction per catalyst site to the level where microfibrils are formed in the resulting gel. Under conditions of relatively low or no agitation and relatively low monomer concentration, catalyst concentrations as low as about 0.005 millimoles per liter are satisfactory to effect microfibril formation. At higher monomer concentrations, the concentration of catalyst may be increased to as high as about 100 millimoles per liter. At 35–50 atmospheres, and low catalyst concentrations, fibers of polyolefins can be obtained with viscosity average molecular weights in the range of 10 million to 20 million.

While the Ziegler type coordination catalyst is preferred, other types of coordination catalysts are also suitable. Exemplary of these other types of coordination catalysts are the Phillips catalysts and the catalysts of the Standard Oil Company of Indiana. The Phillips solution process is described in U.S. Pat. 2,825,721; the Phillips slurry process is described in British Patent 853,414. The Standard Oil process is described in U.S. Pats. 2,691,647; 2,726,-231; 2,726,234; 2,728,758; 2,773,053; 2,791,575; 2,795,-574; and 2,834,769.

The pressure employed in the polymerization reactor to form the fibrous gel may be any pressure conventionally employed for the particular type of olefin to be polymerized and the coordination catalyst used. However, it may be desirable to employ a higher pressure than conventionally employed in order to increase the reaction rate. Thus, if a Ziegler type coordination catalyst is employed, and the olefin is ethylene or propylene, pressures conventionally employed in the art are generally from subatmospheric up to about 100 atmospheres; for the process of the present invention such pressures may also be employed, but if it is desired to increase the reaction rate and form polyolefins having viscosity average molecular weights of 10 million to 20 million or higher, the range of pressures employed may be 35 to 50 atmospheres or higher. For the Phillips solution and slurry processes, pressures may typically range up to 35 atmospheres. In the Standard Oil polymerization process, pressures in the range of 35–105 atmospheres are typically employed.

The temperature employed in the polymerization reactions of the present invention is maintained between about the freezing point of the solvent up to the melt dissolution temperature of the polymer to be formed at the pressure employed. It is generally preferable to operate between about 20° and about 110° C. for most conditions and monomers.

The melt dissolution temperature of any particular polyolefin in a solvent is easily determined. Low concentrations of the polyolefin (e.g., 0.1 and 1.0% by weight are placed into the solvent in a vial, which is sealed and placed in an oil bath. The temperature of the oil bath is raised slowly (10° C./hr.) until the last trace of polymer disappears. This temperature is the melt dissolution temperature. For ultra-high molecular weight (about 10 million) polyethylene at low concentration (0.1% by weight) in cyclohexane, the melt dissolution temperature is $118.5 \pm 1.9°$ C. For a dilute solution of high molecular weight polypropylene in cyclohexane, the melt dissolution temperature is 130° C. At higher concentrations the melt dissolution temperature approaches the melting point of the polyolefin. At higher pressures the melt dissolution temperature is lower because of the increased solubility of the polymer at high pressures.

As is the case with the formation of polyolefin nascent fibers described in copending application Ser. No. 874,-687, the reaction medium employed in the process of the present invention is also important to the formation of fibrous gel. The medium employed must essentially meet the same requirements set forth in the aforementioned patent application. Generally, the medium employed should be a suitable reaction medium for the polyolefin to be formed during the polymerization reaction. By the term "suitable reaction medium," it is intended to mean a composition into which the polyolefin to be formed is swellable or soluble to a significantly measurable extent and does not interfere with the polymerization reaction. By the phrase "significantly measurable extent" is meant that the measured amount of solvent absorbed by the polyolefin at equilibrium or after some finite time of soaking in the solvent, is above that which could reasonably be classified as due to experimental error rather than actual absorption (about 0.5% by weight).

A more accurate characterization of a suitable reaction medium is the "solubility parameter" ($\delta$) or "cohesive energy density" ($\delta^2$) of the "solvent." The cohesive energy density is especially useful for predicting the solubility and solvent sensitivity of polymers. Polyolefins are soluble only in those solvents whose solubility parameter or cohesive energy density is not too far different from their own.

A detailed discussion of solubility parameter and cohesive energy density is set forth in copending application Ser. No. 874,687, and in the book "Polymer Handbook," edited by Brandrup and Immergut, Interscience Publishers, 1966, pp. IV–341–68; and in "Encyclopedia of Polymer Science and Technology," vol. 3, Interscience Publishers, pp. 833–62.

In order to qualify as a suitable reaction medium for forming a gel of polyethylene macrofibrils, the reaction solvent chosen should be as close as possible to the 7.7–8.35 (cal./cc.)$^{1/2}$ solubility parameter range of polyethylene at 25° C., preferably between about 6.5 and 9.5 (cal./cc.)$^{1/2}$, and probably should not be outside the range of about 6.0–10.0 (cal./cc.)$^{1/2}$.

The solubility parameter of polyethylene at any temperature "T" can be determined by the following equation:

$$S_{PE} = 8.4822 - 0.00642 \times (T° C.)$$

Similarly, the reaction medium chosen for polypropylene gel fiber formation should have a solubility parameter approaching 7.9–8.2 (cal./cc.)$^{1/2}$. The preferred range is between about 6.5 and 9.5 (cal./cc.)$^{1/2}$, and probably should not be outside the range of about 6.0–10.0 (cal./cc.)$^{1/2}$.

Solubility parameter values for polyolefins other than polyethylene and polypropylene are to be found in table 4, pages IV–362–67 of "Polymer Handbook," cited above, or can be calculated as set forth in copending application Ser. No. 874,687. It should be noted that the solubility parameters set forth in "Polymer Handbook" are calculated from the heats of vaporization at 25° C., and that different values will be obtained at more elevated temperatures. At such elevated temperatures, the solubility parameter may approach close enough to that of the polyolefin to be formed to be a useful reaction medium, whereas at lower temperatures it wuold not be useful. As mentioned previously, the upper limit on temperature for gel fiber formation is the melt dissolution temperature of the polymer, since as this temperature is approached the microfibrils in the gel are detrimentally affected.

An alternate approach to the definition of solubility characteristics of solvents useful in the practice of the present invention is difference in solubility parameter $(\delta_s - \delta_p)$ of the solvent and polyolefin. The heat of mixing of solvent and polyolefin is dependent upon the quantity $(\delta_s - \delta_p)^2$. If the heat of mixing is not so large as to prevent mixing, then $(\delta_s - \delta_p)^2$ has to be relatively small. For polyethylene and polypropylene it has been determined that $(\delta_s - \delta_p)^2$ should desirably be less than about 3.0 (cal./cc.) for fibrous gel formation, and preferably less than about 1.5.

While the reaction medium chosen should preferably have a solubility parameter approaching that of the polyolefin to be formed, for polyolefins other than polyethylene the reaction medium thus chosen should not have a solubility parameter so chose to that of the polyolefin as to cause dissolution of the microfibrils. This precaution does not apply to polyethylene because of its large enthalpy of fusion, whereby there is no problem of microfibril dissolution below the melt solution temperature. However, for other polyolefins having a small enthalpy of fusion, any microfibrils formed may be quickly dissolved if the solubility parameter of the reaction medium is substantially the same as that of the polyolefin being formed.

In copending application Ser. No. 874,687, it is disclosed that one of the principal factors contributing to the formation of polyolefin nascent fibers is the shear stress to which the reaction mass is subjected during polymerization. In the present process, the formation of such nascent fibers during the polymerization reaction is to be avoided since it is desired to postpone the formation of such fibers until after the polymerization reaction is completed. Therefore, the shear stress to which the reaction mass of the present invention is subjected is lower than that to which the reaction mass of the aforementioned copending application is subjected, and, in fact, fibrous gel made up of microfibers and lamellae alone may be formed at zero shear stress. However, a gel formed with no shear stress does not form fibers that are as satisfactory for papermaking purposes as those formed from gels for which shear was employed during formation. As mentioned in the aforementioned copending application Ser. No. 874,687, it is difficult to give an absolute figure for the minimum shear stress required to effect reactor fiber formation since the minimum shear stress required is dependent upon several reaction conditions. The probable minimum shear stress stated in Ser. No. 874,687 for nascent fiber formation was in the range of 0.1–1.5 pounds (force)/sq. ft. for most reaction conditions and most olefins.

Therefore, the shear stress for forming fibrous gel and short of forming nascent fibers be less than the minimum nascent fiber forming range for identical monomer and reaction conditions employed, i.e., less than about 0.1 to about 1.5 pounds (force)/sq. ft. for most reaction conditions and for most olefins. Typical reaction conditions at various degrees of shear stress are set forth in Example 6. Preferably, at least gentle agitation is employed.

While shear stress is easily measured in simple shear devices, such as a cylindrical rotor rotating in a cylinder or flat blade stirrer, it is very difficult to measure in more complex geometries. Also, the exposure of any particular portion of a body of liquid to the shear zone is a complex consideration. Therefore, a relatively simple method of measuring shear stress in any shear geometry has been devised. This method is based upon the employment of microcapsules which rupture only at the critical shear stress of 0.1 pounds (force)/sq. ft. (5 newtons/sq. meter) or greater.

Suitable microcapsules are those designated H-85 and obtained from Balchem Corporation of Slate Hill, New York. These microcapsules pass a 16-mesh Tyler screen but are retained on a 20-mesh screen. These microcapsules are elliptical-shaped with some concavities. The major axis was 1203.6$\mu$ (standard deviation of 141.3) and the minor axis was 1041.4$\mu$ (standard deviation of 92.7). The shell wall thickness of the microcapsules prior to treatment was 33.1$\mu$ (standard deviation of 13.0). They have a gelatin shell and contain 42.6% by weight toluene.

These microcapsules were soaked in a 35.5% by weight mixture of water in isopropanol for one hour. They were then placed on a screen and dipped into isopropanol for five seconds to reharden the gelatin shell.

The microcapsules were then placed into 260 cc. of cyclohexane in a cylindrical vessel 8 inches in height and 3.028 inches in diameter. The microcapsules are added to give a concentration of 0.2 grams/liter. The vessel had a coaxially disposed rotor 2.838 inches in diameter and 8 inches long. The gap between the rotor and vessel wall was 0.2413 cm. The temperature of the cyclohexane was 26° C. (viscosity of 0.884 centipoises). The rotor was rotated at 3615 r.p.m. for 5 seconds. The shear stress in the gap was 0.1 pounds (force)/sq. ft. (5 newtons/sq. meter). All of the capsules ruptured as indicated by the amount of toluene present in the cyclohexane. At less than 0.1 pound (force)/sq. ft. shear stress, none of the capsules ruptured.

Capsules thus prepared may then be placed into any shear system in an amount of 0.2 grams/liter and the system subjected to the shear employed in the process for the usual process time. The number of capsules ruptured is then determined by analyzing for toluene by conventional analytical techniques such as gas chromatography or ultraviolet spectroscopy.

It has been determined that to form fibrous gel (rather than the free fibers of Ser. No. 874,687) less than 80% of the capsules should rupture in the shear system. This means that a significant portion of the system has been exposed to a shear stress less than 0.1 pounds (force)/sq. ft. The 80% limit was determined by employing the residence time distribution concept set forth in Chapter 9 of Chemical Reaction Engineering, Octave Levenspiel, John Wiley & Sons, Inc., New York, 1962.

Briefly, these concepts are as follows. A fraction (S) of fluid passes through the shear zone duirng each cycle. The fraction not passing through the sear zone is $(1-S)$, and the fraction not passing through the shear zone after $(n)$ cycles is $(1-S)^n$. The numbered cycles $(n)$ is calculated from the total time and the number of cycles per unit time ($w$). This latter quantity ($w$) is determined by the tracer technique described in the Levenspiel reference cited above using the relationship $$w = \frac{1}{\int_0^\infty tE(t)dt}$$

wherein $w$ = number of cycles per unit time
$t$ = time
$E(t)$ = first passage time distribution of tracer through the shear zone The fraction of capsules passing through the shear zone (determined by the amount of toluene released since all capsules passing through a shear zone in excess of 0.1 pounds (force)/sq. ft. rupture) is $1-(1-S)^n$. From experimental data it has been found that if $1-(1-S)^n$ is less than 0.80 (80% rupture) fibrous gel is formed, whereas if more than 80% of the capsules rupture $$(1-(1-S)^n > 0.8)$$

the free fibers of Ser. No. 874,687 are formed.

While specific microcapsules are described above for determining whether the critical shear stress of 0.1 pounds (force)/sq. ft. is exceeded or not, any microcapsule containing a material which can be measured in the sheared medium can be employed. The gelatin shell thickness can be reduced to proper value for rupture at 0.1 pounds (force)/sq. ft. by the water-isopropanol soaking technique described above. This is done by using various concentrations of water in isopropanol and determining whether or not the capsules rupture under 0.1 pounds (force)/sq. ft. in a known shear stress zone such as the rotor-cylinder apparatus described above. Once the appropriate microcapsules are formed, they may then be reproduced for use in testing the shear stress in the unknown system. The microcapsules can be designed by this technique to rupture at about any shear stress level and a fairly accurate determination of shear stress made in the unknown system by analyzing a series of microcapsules rupturing under known shear stress levels.

It has also been found that the type of shear stress to which the reaction mass is subjected is important and it appears that predominantly laminar flow and/or low turbulent flow is highly desirable. Chopping of the gel such as takes place in a polymerization reactor employing blender type blades at higher r.p.m. induces too much turbulence into the reaction medium to permit gel formation.

The polymerization of olefin to polyolefin must be relatively rapid in order to form a fibrous gel instead of crumb.

The reaction rate per unit of catalyst, or apparent specific reaction rate, may be mathematically described by the expression $$\frac{dM}{C\,dt}$$

wherein "M" is monomer consumed in millimoles, "$t$" is time in seconds, and "C" is amount of catalyst (transition metal halide) in millimoles.

The apparent specific rate is dependent upon the catalyst type, concentration of monomer in the reaction medium, temperature and pressure.

Since the minimum apparent specific rate necessary to form fibrous gel from any particular olefin is dependent upon all of the aforementioned variables, an absolute value therefor cannot be set forth without reference to a specific set of these variables. The minimum apparent specific rate required for fibrous gel formation for a particular olefin and catalyst system at any particular temperature and pressure must be determined for each set of variables chosen within the limits of each variable as specified herein. Since a selection of olefin, catalyst, temperature and pressure leaves monomer concentration in the reaction medium as the remaining variable determining the apparent specific degree, it is usually this variable in practice which determines whether or not the minimum rate for fibrous gel formation is achieved. Once these other variables are chosen, the concentration of monomer in the medium depends upon the degree of pre-saturation of the medium (where the monomer is gaseous), the rate of monomer being fed into the medium, the nature of the medium (solubility of monomer therein) and the degree of agitation of the medium (dispersion of monomer therein). Since it is preferable to saturate the reaction medium with the monomer in the case of gaseous monomers prior to introduction of the catalyst, and since the monomer is usually fed into the medium in an excess amount during polymerization, and since the reaction medium itself is chosen within the parameters prevously discussed, in practice the apparent specific rate is principally adjusted by the degree of agitation. However, as mentioned previously, the degree and type of agitation (shear stress) should not be such as to effect nascent fiber formation, as disclosed and claimed in copending application Ser. No. 874,687.

This is not to say that the other variables cannot be employed in practice to obtain a reaction rate sufficiently high to effect gel formation, especially where no agitation (zero shear stress) is employed. For example, if it is determined that for a particular set of chosen variables the shear stress must be so high as to cause nascent fiber formation, then the temperature or pressure of the system may be adjusted to increase monomer solubility in the reaction medium, thereby increasing monomer concentration and raising the apparent specific rate. Alternatively, a more active coordination catalyst may be substituted to thereby increase the apparent specific rate. Further, a reaction medium having a smaller $(\delta_s-\delta_p)^2$ could be chosen to lower the minimum apparent specific rate required for gel formation, as is discussed elsewhere herein. A number of examples of apparent specific rates for various reaction conditions are set forth in the specific examples contained herein.

Figure 7:
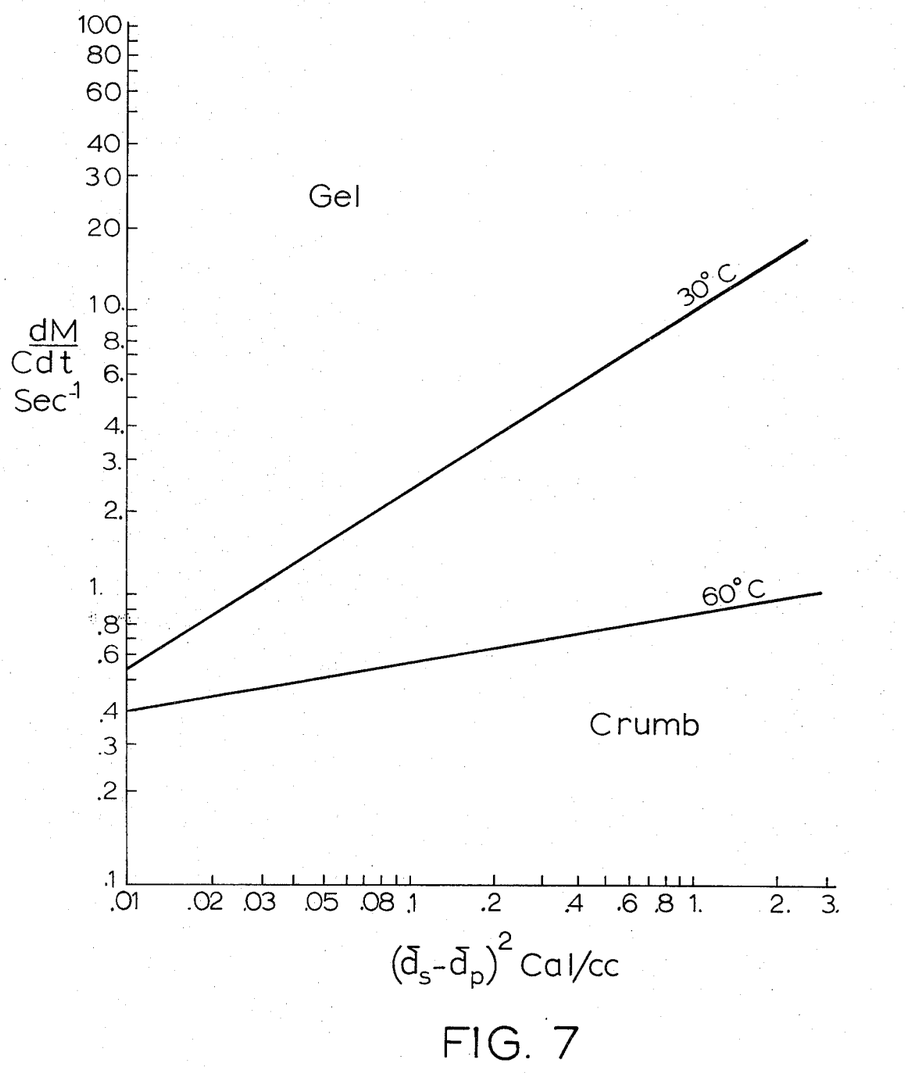
FIG. 7 is a graph depicting the minimum apparent specific reaction rate require to form fibrous gel as a function of the reaction medium and temperature.

FIG. 7 illustrates graphically the relationship between apparent specific reaction rate and solvent $((\delta_s-\delta_p)^2)$ at various temperatures for polymerization of ethylene. For any given solvent and temperature, the minimum apparent specific reaction rate necessary to form fibrous gel may be generally determined from the graph. Any value of apparent specific reaction rate above this minimum value will form fibrous gel. The only upper limit on reaction rate is the practical one imposed by the catalyst, monomer concentration, temperature and pressure. Also, if the apparent specific reaction rate is being adjusted upwardly by increasing the degree of agitation, the degree of agitation (shear stress) should not be so great as to cause nascent fiber formation.

It is seen by reference to FIG. 7 that the "better" the reaction medium (i.e. for the smaller values of $(\delta_s-\delta_p)^2$), the lower the reaction rate required to effect fibrous gel formation. Also, it is seen that higher temperatures promote fibrous gel formation by lowering the reaction rate required therefor.

It has been determined that the minimum apparent specific reaction rate necessary for gel formation where the polymerization is carried out close to the melt dissolution temperature of polyethylene in a very "good" solvent (decalin, $(\delta_s-\delta_p)^2=0.01$), is about 0.05 to 0.10 (sec.$^{-1}$). This may be taken therefore as the absolute minimum apparent specific reaction rate generally necessary to effect fibrous gel formation by the process of the present invention. Preferably, the apparent specific reaction rate is greater than 1.0 (sec.$^{-1}$).

Figure 5:
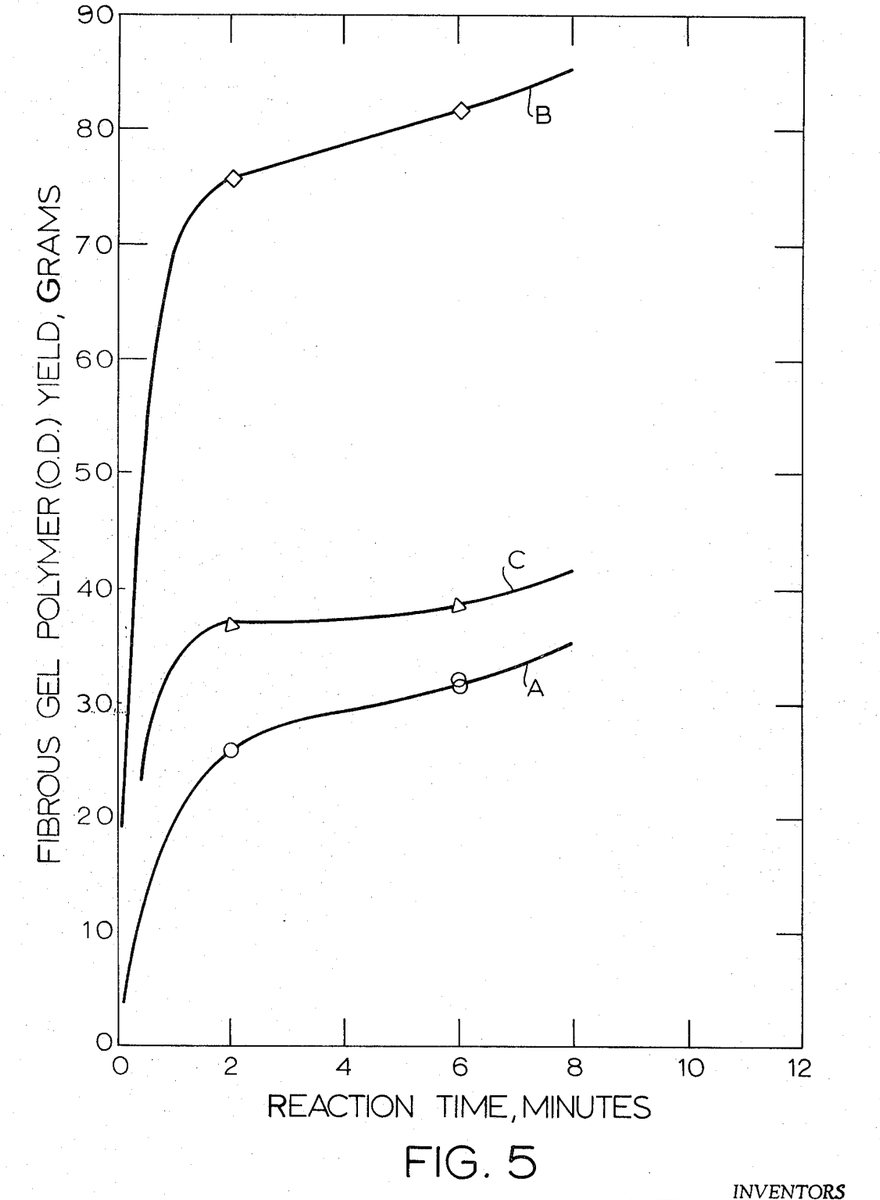
FIG. 5 is a graph depicting yield of polyethylene fibers as a function of reaction time and temperature.

An indication of the relatively rapid reaction rate involved in the present process is illustrated in FIG. 5, wherein a polymerization reaction involving ethylene is carried out at various temperatures, and polymer yield is plotted versus reaction time. It is seen that while polymerization continues beyond the 12-minute time ordinate, gel formation is essentially completed during the first 2–4 minutes at all temperatures. It has been found that due to the high reaction rates involved in the polymerization of olefins to polyolefin fibrous gel and the upper limit of about 30% polymer in the gel, the reaction can in all cases be substantially completed within 30 minutes in a batch process, which is also quite close to the residence time involved in a continuous process. Details of the process conditions upon which the curves of FIG. 5 are based are set forth in Example 9.

After formation of the fibrous gel, the gel is refined to liberate and/or form discrete fibers of polyolefin therefrom. The word "refined" as employed for this step of the process is not intended to mean the ultimate preparation of the fibers for their end used, such as in making nonwoven webs or in spinning yarns. The phrase "refined" as employed herein is intended to mean that step wherein polyolefin fibers are liberated and/or formed from the gel.

Refining is accomplished by subjecting the fibrous gel to a shear strees great enough to liberate and/or form fibers therefrom. The minimum shear stress required is dependent upon numerous factors and an absolute value therefor cannot be stated without taking these factors into consideration. However, in general, it is desirable that the shear stress be above about 0.1 to 1.5 lbs. (force)/sq. ft. The shear stress should not be so great as to detrimentally affect the fibers.

Refining is preferably accomplished by subjecting the gel to attritional forces, preferably in the presence of reaction medium. This may preferably be accomplished by the use of several types of apparatus such as the conventional type of disc refiners employed in the papermaking art. Other types of papermaking refining equipment suitable for forming and/or liberating the fibers from the gel include the PFI mill, Dyna Pulper and Jordans. The type of equipment employed is not critical, it being necessary only to impart to the fibrous gel sufficient attritional forces or shear stress to liberate and/or form fibers therefrom. The magnitude of attritional forces necessary to accomplish this is readily determinable for the particular type of equipment employed. The only upper limit on the degree of agitation imparted to the gelatinous mass is that it should not be so high as to cause undue chopping of the fibers into a form which may be unsuitable for the ultimate end use.

Whereas the liberation of already formed fibers in the gel involves separation, the mechanism involved in the concurrent fiber formation from the microfibril and macrofibril portion of the polyolefin gel described hereby by such refining action is not completely understood. It is hypothesized that agitation of the gel during refining causes the microfibrils and macrofibrils to align themselves into fibers. Microscopic analysis of the polyolefin fibers thusly formed shows them to be made up of such macrofibrils.

Once the fibers are formed from the gel by refining, the reaction medium and catalyst may be removed therefrom by conventional techniques. Further mechanical treatment of the fibers to separate discrete fibers from fiber bundles may be effected by conventional defibering techniques, such as in a disc refiner.

One of the unique features of the present process is that it provides fibers (after refining) which can have a sorbed solvent content at room temperature (20° C.) up to about 90% by weight of the total solvent-fiber mass. By "sorbed" solvent is meant solvent present as absorbed and adsorbed solvent. The amount of such sorbed solvent can be controlled by the amount of drying, solvent extraction, mechanical expression, steam distillation, or other conventional means of solvent removal from the fibers obtained after the refining step. The presence of such sorbed solvent has been found to aid fiber bonding and it is preferable to have a minimum of ½% by weight (20° C.) retained for this purpose. However, once the solvent is removed, it cannot be resorbed to provide the same degree of fiber bonding.

The viscosity-average molecular weight ($\overline{M}_v$) of the polyolefins produced in the present process ranges up to about 20 million and above, preferably between about one-half million to about 20 million in view of the improved strength properties over fibers of lower molecular weight polyolefins. The molecular weight can be controlled to any value desired in the conventional manner of employing chain termination agents. However, if the molecular weight ($\overline{M}_v$) falls below a certain minimum value, which for polyethylene and polypropylene is about 40,000 to 250,000, fibers will not be obtained upon refining. Therefore, it is generally very desirable to carry out the polymerization in the absence of any chain transfer agent to form a polyolefin having an essentially zero melt index.

The range of molecular weight distributions of the linear polyolefins such as polyethylene produced by the present process (as measured by the ratio of the weight-average molecular weight ($\overline{M}_w$) to number-average molecular weight ($\overline{M}_n$) appears to be within the range reported in the literature for most common commercial grades. For example, a typical polyethylene produced by the present process (Table 6, run 6) has been found to have a molecular weight distribution ($\overline{M}_w : \overline{M}_n$) of 14.4.

The density range of the polyolefins obtained by the present process appears to be somewhat broader than that normally obtained by polymerization with a coordination catalyst. For example, polyethylenes are obtained having an ASTM density in the range of about 0.926–0.990.

The crystallinity of polyethylene obtained in the present process is typically between about 55 and 85, as determined by differential scanning calorimetric measurement and between about 69 and 84, as determined by X-ray techniques.

One of the most distinguishing features of polyolefin fibers formed by the process of the present invention is the high surface area provided, due at least in part to the microfibrillar and macrofibrillar structure of the fibers. Staple polyolefin fibers typically have surface areas (as measured by the conventional gas adsorption technique) of much less than about 1.0 square meter/gram. For example, 3 denier melt spun polyethylene staple has a surface area of about 0.16 m.$^2$/gram. Cellulose fibers (Whatman No. 1 filter paper) have a surface area of about 1.0 square meter/gram. The polyolefin fibers of the present invention generally have a surface area greater than 1.0 square meter/gram, generally higher than about 25 m.$^2$/gram, and as high as 200 m.$^2$/gram or higher, as measured on freeze dried fibers or fibers solvent exchanged to water through isopropanol.

The fibers of the present invention are not completely uniform in cross-section along the length thereof. This is an advantage over staple fibers, which have uniform cross-section, because such non-uniformity contributes to the web-forming properties of the fibers. A majority of the fibers of the present invention are oval or circular in cross-section, rather than ribbon-shaped.

When the fibers of the present invention are classified according to TAPPI standard test No. T–233 SU–64 using the Bauer-McNett classifier (having screens of 20, 35, 65, 150 and 270 mesh arranged in sequence), more than 50% by weight are retained on the 150 mesh or coarser screens. Polyolefin pulps may be made having an average diameter of a majority of the fibers (by weight) exceeding about 10 microns; such pulps are particularly useful for making synthetic papers. The average length of a majority of the fibers (by weight) is greater than 250 microns. The average length to diameter ratio of the fibers is greater than 5:1, and a majority of the fibers (by weight) have a length to diameter ratio greater than 10:1. Fibers having a diameter up to 600 microns or higher and lengths up to 4 mm. or more have been observed.

The fibers of the present invention have great utility in making nonwoven webs, particularly by normal papermaking techniques wherein the fibers are deposited from an aqueous slurry upon a moving foraminous forming surface such as a Four-drinier wire. It has been found that sheets formed from the fibers of the present invention have extremely high opacity, which is quite useful in printing and other types of papers. The fibers of the present invention may be mixed with cellulose fibers to improve the opacity of paper formed therefrom. A particularly useful mixture is up to 50% polyolefin fibers mixed with cellulose fibers.

Prior to discussing the specific details of examples illustrating the present process, a brief description of a suitable apparatus for carrying out the process of the present invention will be presented.

Figure 1:
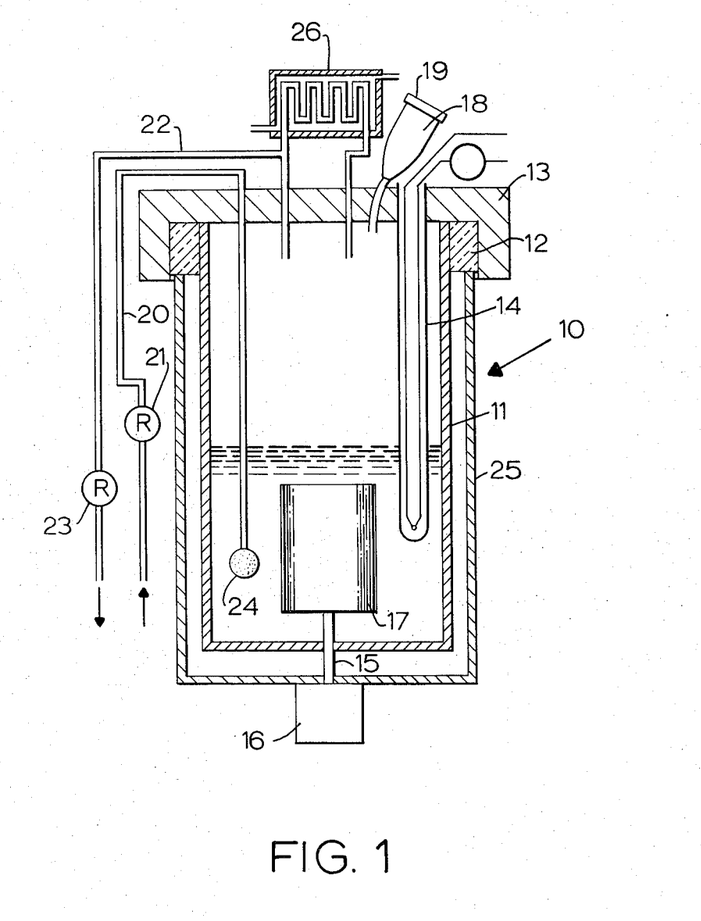
FIG. 1 is a schematic representation of one form of apparatus suitable for forming the fibrous gel of the process of the present invention.

Reference is made to FIG. 1 of the drawing in which reference numeral 10 refers to the reactor of the first type. The reactor 10 is comprised of a cylindrical reaction vessel 11 fitted with a ground glass collar 12. A resin kettle lid 13 is located on top of the reactor, sealing it from the atmosphere. Located inside the reaction vessel is a thermocouple well 14. Through the bottom of cooling jacket 25 and reaction vessel 11 is a shaft 15 attached at the outside end thereof to a variable speed motor 16 and having at the other end thereof inside the reactor a cylindrical agitator 17. Side arm 18 protrudes through the lid 13 into the interior of the reactor and is fitted at the outside end with a serum cap 19 for catalyst addition via hypodermic syringe. Monomer inlet 20 traverses through the lid 13 and is fitted with a rotameter 21 for measuring gaseous monomer flow rates. The end of monomer inlet conduit 20 located inside the reaction vessel is fitted at its extremity with a fritted glass dispersion tip 24 to effect dispersion of the gaseous monomer in the polymerizing solvent. Excess gaseous monomer is withdrawn from the reactor via conduit 22, which is likewise fitted with a rotameter 23 to measure the exit gaseous monomer flow rate. Reflux condenser 26 returns condensables to the reaction vessel 11.

Figure 2:
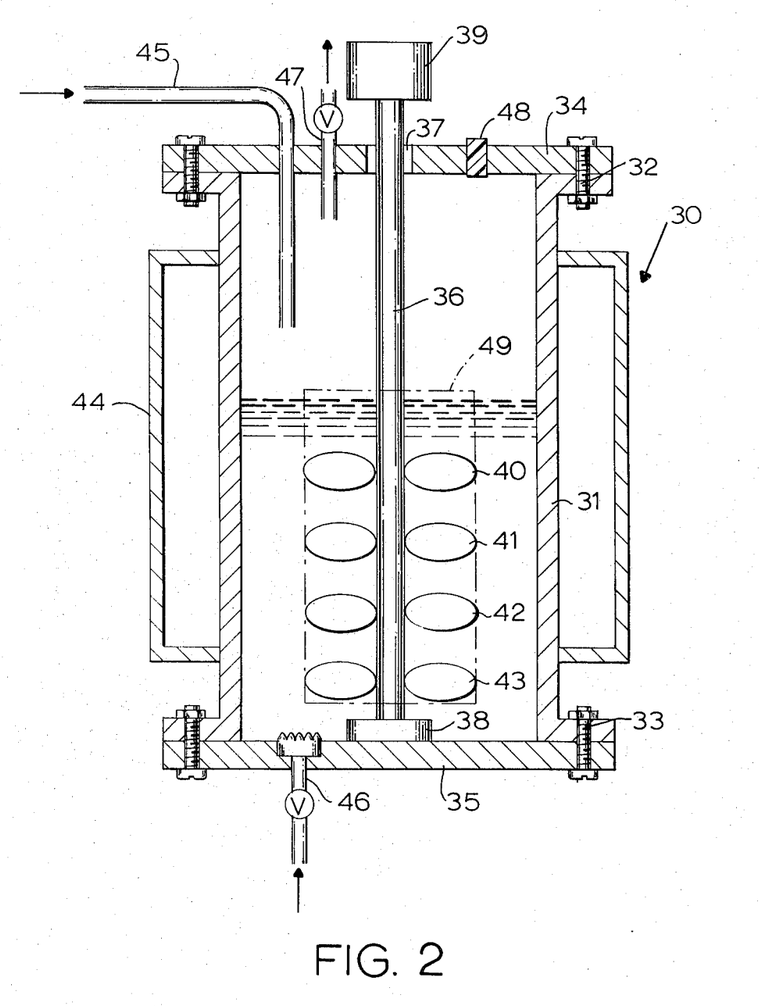
FIG. 2 is a schematic representation of another form of apparatus suitable for forming the fibrous gel of the process of the present invention.

A larger scale reactor 30 is illustrated in FIG. 2. Reactor 30 is comprised of a generally cylindrically shaped vessel 31 having a flange 32 at the upper end thereof and flange 33 at the lower end thereof. A circular top plate 34 is attached to vessel 31, such as by bolts through the outer perimeter of the top plate and the upper flange 32. Similarly, a bottom plate 35 is attached to vessel 31 by suitable means, such as bolts extending through the outer periphery thereof and through the lower flange 33. Agitator shaft 36 extends through a centrally located hole 37 in upper plate 34, which said hole 37 is fitted with a mechanical seal assembly. The lower end of agitator shaft 36 is guided in its lower portion by glass-impregnated-teflon foot bearing 38. Agitator shaft 36 is driven by suitable motor means 39. Rotors 40, 41, 42 and 43 are located along the length of agitator shaft 36. Each rotor has six blades which do not have any pitch. Alternatively, a cylindrical rotor 49 illustrated in phantom may be employed.

Reaction vessel 31 is surrounded by a jacket 44, wherein cooling or heating liquid may be circulated. Inlet conduit 45 permits introduction of reaction medium into the reaction vessel 31. Monomer is introduced through sparger 46, and excess monomer exits through outlet 47. Serum cap 48 permits introduction of the catalyst and other materials in small quantities into the reaction vessel 31. A thermocouple not illustrated may be inserted into the reaction vessel at any suitable location to monitor temperature.

In operation the reaction vessels of FIGS. 1 and 2 were first flushed with nitrogen and then the reaction medium introduced. In the reactor of FIG. 1, ½ liter of reaction medium was employed in the examples, whereas one gallon of reaction medium was employed in the reactor of FIG. 2, unless otherwise noted. The reaction medium was then saturated with the olefin monomer, and a slight positive pressure maintained in the reaction vessel with monomer. The catalyst was next added via the serum cap, with the aluminum alkyl being added first. Where agitation was employed it was maintained throughout the polymerization. Polymerization was quenched by injecting isopropanol (FIG. 1) or ethanol (FIG. 2) into the reaction medium via the serum cap.

The catalysts themselves were prepared in the manner conventional in the art. Reference is made to copending application Ser. No. 874,687 and to the previously cited patents on the Ziegler, Phillips and Standard Oil processes, as well as standard texts for further description on catalyst preparation.

The reaction medium employed may be any of those solvents meeting the solubility parameter criteria described previously. Exemplary of suitable solvents employable as the reaction medium in the process for forming gels of polyethylene and polypropylene are cyclohexane, decalin, heptane, tetralin, chloronated solvents, toluene, n-octane, isooctane, m, o and p-xylene, mineral oils, Socal 1 (a mixture of normal and branched aliphatic hydrocarbons, naptha and aromatics), aliphatic hydrocarbons such as hexane, p-cymene and mixtures thereof.

The examples which follow illustrate various aspects of the invention, but are not to be construed as limiting the invention more narrowly than is stated in the claims.

In all of the tables, the catalyst systems are identified by code as follows:

1—$VOCl_3 + (C_2H_5)_3Al$
2—$VOCl_3 + (C_2H_5)_2AlCl$
3—$TiCl_4 + (C_2H_5)_3Al$

In all of the tables, "catalyst concentration" refers to the concentration of the transition metal halide.

In all of the tables, the solvents are abbreviated as follows:

i-$C_8$=isooctane (2,2,4-trimethyl pentane)
c-hex=cyclohexane
p-cy=p-cymene
p-xyl=p-xylene
n-hep=n-heptane
tol=toluene
dec=decalin The apparent specific reaction rate $$\frac{dM}{C\,dt}$$

reported in the examples employing the apparatus of FIG. 1 (e.g., examples 1, 2, 5 and 6) was determined by dividing the monomer consumption (in millimoles) by the actual time (in seconds) monomer is being used and the catalyst amount (in millimoles). The different $$\frac{dM}{C\,dt}$$

values for each time interval measured are then weighted by the fraction of polymer produced in that interval, and an average $$\frac{dM}{C\,dt}$$

calculated. With the examples employing the apparatus of FIG. 2 (e.g., examples 3, 4 and 9) the value of $$\frac{dM}{C\,dt}$$

was determined by dividing the polymer yield (in millimoles) by total reaction time (in seconds) and catalyst amount in millimoles. The apparent specific reaction rate is referred to in all of the examples as "reaction rate."

The shear stress reported in the examples for the low temperature procedure was calculated only where the rotor was a cylinder (either FIG. 1 or FIG. 2 configuration). The shear stress reported is the mean shear stress ($\tau$ mean) in the annular space between the rotor and the wall of the reaction vessel, and was determined by the following equation:

$$\tau_{mean} = \mu \cdot \left[\frac{dv}{dr}\right]_{mean} \cdot \frac{1}{g}$$

where $\mu$ = reaction fluid viscosity (lb. mass/(ft.) (sec.))
$g$ = gravitational constant $$[v]_r = \frac{T \times g}{4\pi\mu L}\left[\frac{1}{r} - \frac{r}{R^2}\right]$$

T = measured net torque of rotor cylinder (ft.-lb. (force))
L = length of rotor cylinder (ft.)
r = radial distance into annular space (ft.)
R = radius of reaction vessel (ft.)

By the eman value theorem, $$\left[\frac{dv}{dr}\right]_{mean} = \frac{[v]_{r_c}}{R - r_c}$$

where $r_c$ = radius of rotor cylinder (ft.)

The molecular weights reported in the examples are viscosity-average molecular weights ($\overline{M}_v$).

The viscosity average molecular weights in the following examples were determined by the relationship where $(\eta) = kM_v^a$ $(\eta)$ = intrinsic viscosity, and is determined by Martin's equation (set forth on p. 207 of the book "Addition Polymers" by D. A. Smith, Plenum Press, New York, 1968. In Martin's equation, the "k" for high density polyethylene has been determined empirically to be 0.63 and for polypropylene to be 0.81). The specific viscosity used in Martin's equation was usually first corrected for shear rate, using the relationship of Francis et al. (J. Polymer Sci., 31, 453 (1958)).

K = constant, from literature
a = constant, from literature. For polyethylene, the values of Chiang (J. Polym. Sci., 36, 91 (1959)) were used; for polypropylene, the values of Redlich were used (J. Polym. Sci., A1, 393 (1963)).

Experimental viscosity measurements for use in determining viscosity average molecular weights in accordance with the foregoing equation were made in decalin at 135° C. using Ubbelohde No. 50 or 75 viscometers.

Fibers produced from various molecular weight polyolefins were formed into nonwoven sheets and tested for various parameters conventional in the papermaking art.

These parameters are caliper (TAPPI Standard Test No. T411 os–68), opacity and scattering coefficient (TAPPI Standard Test No. T425 m–60), breaking length (TAPPI Standard Test No. T–494), stretch (TAPPI Standard Test No. T–494) rupture energy (TAPPI Standard Test No. T–494), and tear factor (TAPPI Standard Test No. T–220). The fibers were prepared for nonwoven web formation by suspending about 0.25 gram of the fibrous gel (dry weight of fibers) in about 300 ml. of isopropanol, beating for 5 seconds in a one-quart Waring blendor at 10,000 r.p.m., refining for 4 minutes in a miniature disc refiner, with the gap set for 2 minutes at 0.057 inch and for 2 minutes at 0.014 inch at 8,000–10,000 r.p.m. The miniature disc refiner is merely a modified one-pint Waring blendor wherein the blades are replaced with a disc 23.87 mm. in diameter, 6.35 mm. thick and having four equally spaced grooves, 2.32 mm. long, 1.016 mm. deep and 4.57 mm. wide machined into the upper surface thereof whose center lines are offset 4.06 mm. from the center of the disc, and which has stationary disc centered thereover and adjustable vertically up and down to vary the gap between the discs, the upper stationary disc having the same diameter as the moving, lower disc, is 8.89 mm. thick and has six equally spaced holes extending therethrough from the upper surface to the lower surface, the holes being 6.35 mm. in diameter and being located 11.93 mm. from the center of the disc. To the resulting slurry of free-floating fibers is added 50 ml. of isopropanol, and the slurry drained by suction through a No. 54 Whatman filter paper placed on top of a wire mesh screen 72 mm. in diameter removably located at the bottom of a stainless steel cylinder 10 cm. high, the slurry being stirred prior to removal of the isopropanol with a perforated stirrer. The resulting nonwoven web is placed between standard TAPPI blotters and pressed for 3 minutes at 118 pounds per square inch of sheet. The filter paper is removed from the handsheet, and the handsheet pressed at 185° F. (85° C.) at 31.25 pounds per square inch of sheet for 5 minutes. New blotters are employed and the nonwoven sheet pressed for an additional 5 minutes under the same conditions.

EXAMPLE 1

Different Solvents

The apparatus of FIG. 1 and the general procedure involving this apparatus previously described were employed for polymerizing ethylene to form a gel from which polyethylene fibers could be made by subsequent refining. The catalyst, catalyst concentration, temperature, apparent specific rate, solvent and solubility parameter are specified for each run in Table 1, below.

TABLE 1.—DIFFERENT SOLVENTS

| Run number | 1 | 2 | 3 | 4 | 5 | 6 |
|---|---|---|---|---|---|---|
| Polymerization conditions: | | | | | | |
| Catalyst | 1 | 2 | 1 | 2 | 1 | 1 |
| Catalyst concentration (millimoles/liter) | 1.0 | 0.1 | 0.5 | 0.12 | 3.0 | 0.5 |
| Al/Ti or Al/V | 3:1 | 50:1 | 3:1 | 50:1 | 3:1 | 3:1 |
| Solvent | i-C$_8$ | i-C$_8$ | c-Hex | p-Cy | p-Xyl | Benz |
| Temperature, °C | 56 | 55 | 55 | 58 | 69 | 29 |
| Mixer velocity (cm./sec.) | 237 | 327 | 500 | 224 | 1,080 | 562 |
| Shear stress, lb.(f.)/ft.$^2$ | 0.0010 | 0.0015 | 0.0034 | 0.001 | 0.0050 | 0.0041 |
| Viscosity, centipoises | 0.34 | 0.35 | 0.54 | 0.40 | 0.37 | 0.57 |
| Sol parameter ($\delta_s$) | 6.52 | 6.5 | 7.82 | 8.03 | 8.30 | 9.08 |
| $(\delta_s-\delta_p)^2$ (cal./cc.) | 2.5 | 2.5 | 0.09 | 0.05 | 0.07 | 0.64 |
| Reaction rate (sec.$^{-1}$) | 0.85 | 4.4 | 1.3 | 2.2 | 0.84 | 5.23 |
| Polyethylene: | | | | | | |
| Yield (grams) | 1.3 | 0.9 | 0.8 | 1.1 | 4.4 | 14.0 |
| Percent PE in gel | | 5.8 | 7.7 | 5.4 | 12.5 | 5.0 |
| Surface area, m.$^2$/g | 28.0 | 59.7 | 33.1 | 39.0 | 25.0 | 13.8 |
| Density, g./cc. | 0.992 | 0.954 | 0.948 | | 0.945 | 0.932 |
| $M_v \times 10^{-5}$ (corrected for shear) | 0.47 | 3.01 | 1.46 | 0.69 | 1.34 | 2.99 |
| ($\eta$), dl./g. (corrected for shear) | 4.3 | 14.9 | 9.2 | 5.5 | 8.6 | 14.8 |
| Molecular weight$\times 10^{-6}$ (uncorrected for shear) | 0.4 | 2.8 | 1.3 | 0.7 | 1.3 | 2.8 |
| Description of product | Crumb | Gel [a] | Gel [b] | Gel [b] | Gel [c] | Crumb |
| $T_m$ °C | 129 | 132 | 130 | 132 | 130 | 134 |
| Percent crystallinity | | | | 76 | | |
| TAPPI Opacity, handsheet | | 97.5 | 86.7 | 63.0 | 96.3 | 96.0 |

[a] No visible fibrous structure.
[b] Some fibrous structure.
[c] Very fibrous structure.

Note.—In all tables the percent crystallinity of the polyethylene fibers and the nonfibrous polymer (crumb) was obtained by measuring the enthalpy of melting with a Perkin DSC-1 B differential scanning calorimeter at a scanning rate of 2.5° C./minute. The value obtained was then divided by 68.4 calories per gram, the value for 100% crystalline polyethylene. The crystalline melting points ($T_m$) were taken as the peak of the enthalpy curve.

It will be noted that in run 1, the solubility parameter of isooctane is 6.52, which is on the borderline of being a suitable solvent, and the resulting product was crumb. However, in run 2 isooctane produced gel, due to the increased reaction rate. In run 6, the solubility parameter of benzene is 9.08, which is on the upper border of suitability, and the product was crumb due to the low reaction rate for the temperature employed. As a general rule of thumb, the poorer the solvent (within the limits previously mentioned) the greater must the reaction rate be in order to form gel instead of crumb. This is illustrated in FIG. 7, previously discussed, wherein it is seen that for a given solubility parameter difference, either crumb or gel is obtained, depending on whether or not the apparent specific reaction rate is fast enough.

TABLE 2—Continued

| Run number | 1 | 2 | 3 |
|---|---|---|---|
| TAPPI opacity, handsheet | 87 | 63 | 81. |
| Scattering coefficient | | | 419. |
| Density, g./cc. | 0.948 | | |
| $M_v \times 10^{-6}$ (corrected for shear rate) | 1.46 | 0.69 | 1.11. |
| $(\eta)$ dl./g. (corrected for shear rate) | 9.2 | 5.5 | 7.6. |
| $T_m$, °C | 130 | 132 | 132. |
| Percent crystallinity | | 76 | |

NOTE.—See footnotes b and c at end of Table 1.

EXAMPLE 3

Different Catalyst Concentrations

The apparatus illustrated in FIG. 2 and the general procedure therewith previously described was employed for the runs tabulated below in Table 3, illustrating different catalyst concentrations for gel formations.

TABLE 3

| Run number | 1 | 2 | 3 | 4 |
|---|---|---|---|---|
| Catalyst | 1 | 1 | 1 | 1. |
| Catalyst concentration (millimoles/liter) | 0.05 | 0.10 | 0.30 | 1.65. |
| Al/V | 3:1 | 3:1 | 3:1 | 3:1. |
| Solvent | c-Hex | c-Hex | n-Hep | c-Hex. |
| Temperature, °C | 60 | 76 | 11 | 60. |
| Mixer, r.p.m.×10⁻³ | 1.4 | 1.4 | 1.4 | 1.4. |
| Sol parameter $(\delta_s)$ | 7.7 | 7.5 | 7.6 | 7.7. |
| $(\delta_s-\delta_p)^2$ (cal./cc.) | 0.12 | 0.22 | 0.59 | 0.12. |
| Reaction rate | 38.6 | 18.0 | 11.4 | 4.0. |
| Polymer yield (grams) | 37.0 | 34.5 | 66.0 | 129.0. |
| Surface area, m.²/g | 33.7 | 3.9 | 19.3 | 15.0. |
| TAPPI opacity, handsheet | 94.0 | | | 90.5. |
| Scattering coefficient | 1,180 | | | 697. |
| Density, g./cc. | 0.934 | 0.935 | 0.929 | 0.938. |
| $M_v \times 10^{-6}$ (corrected for shear) | 6.4 | 2.97 | 2.54 | 1.5. |
| $(\eta)$ dl./g. (corrected for shear) | 24.3 | 14.27 | 13.3 | 9.5. |
| Molecular weight×10⁻⁶ | | | 2.35 | 2.0. |
| Description of product | Gel ᶜ | Gel ᶜ | Gel ᶜ | Gel and sheets.ᶜ |
| $T_m$, °C | 134 | | | 135. |
| Percent crystallinity | 82 | | | 72. |

NOTE.—See footnote c at end of Table 1.

EXAMPLE 2

Different Catalysts

Again, the apparatus of FIG. 1 and the procedure previously described were employed. Different coordination catalysts are employed to illustrate that polyolefin gel formation is not catalyst specific.

TABLE 2

| Run number | 1 | 2 | 3 |
|---|---|---|---|
| Catalyst | 1 | 2 | 3. |
| Catalyst concentration (millimoles/liter) | 0.5 | 0.12 | 5.0. |
| Al/Ti or Al/V | 3:1 | 50:1 | 1:5. |
| Solvent | c-Hex | p-Cy | Dec. |
| Temperature, °C | 55 | 58 | 88. |
| Mixer velocity (cm./sec.) | 500 | 224 | 444. |
| Shear stress, lb.(f)/ft.² | 0.0034 | 0.001 | 0.0057. |
| Viscosity, centipoises | 0.54 | 0.40 | 1.0. |
| Sol Parameter $(\delta_s)$ | 7.82 | 8.03 | 7.96. |
| $(\delta_s-\delta_p)^2$ (cal./cc.) | 0.09 | 0.05 | 0.002. |
| Reaction rate (sec.⁻¹) | 1.3 | 2.2 | 0.1. |
| Polymer yield (grams) | 0.8 | 1.1 | 4.8. |
| Molecular weight×10⁻⁶ | 1.3 | 0.67 | |
| Description of product | Gel ᵇ | Gel ᵇ | Gel.ᶜ |
| Percent PE in gel | 7.7 | 5.4 | 3.0. |
| Surface area, m.²/g | 33.1 | 39.0 | 17.4. |

EXAMPLE 4

Different Temperatures

Figure 6:
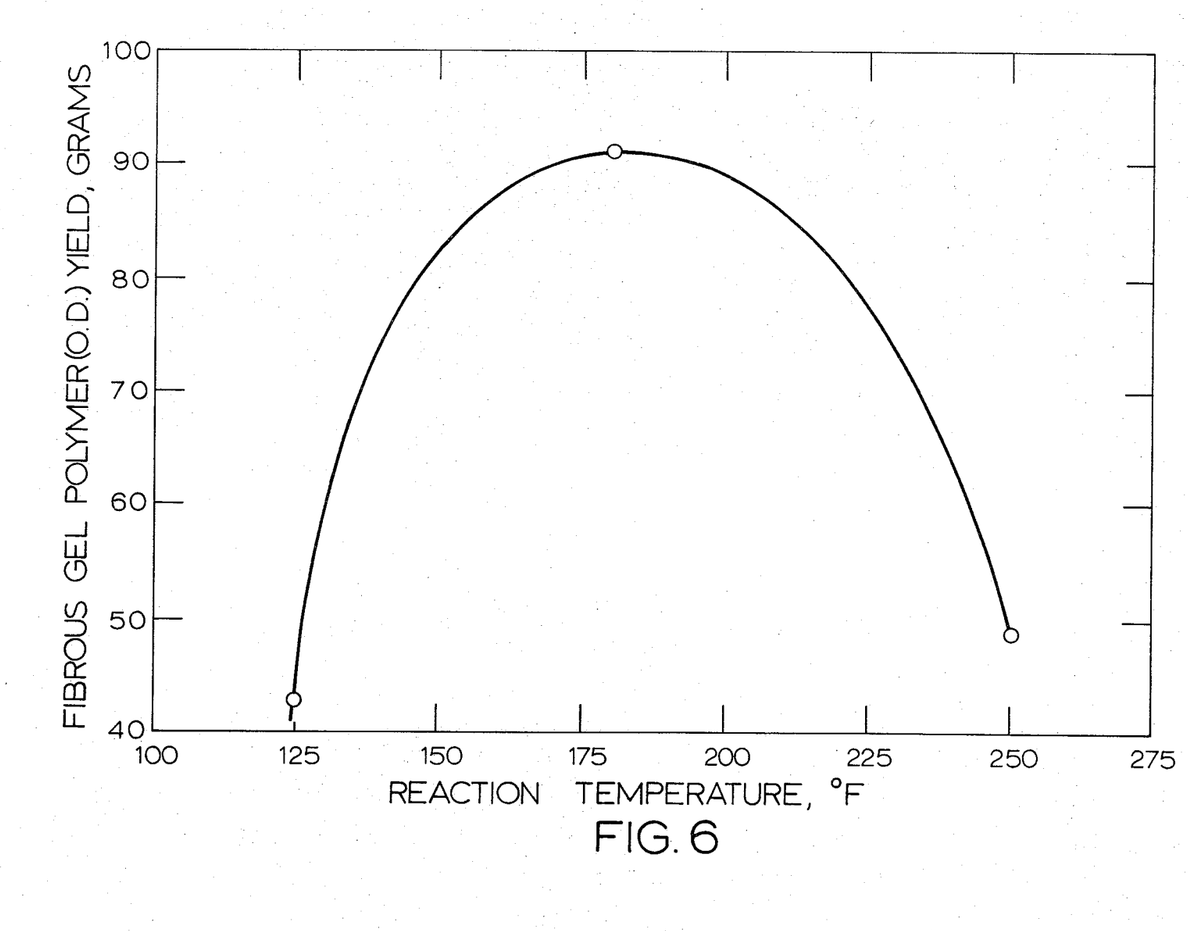
FIG. 6 is a graph depicting the yield of polyethylene fibers as a function of reaction temperature.

The apparatus illustrated in FIG. 2 and the procedure associated therewith previously described were employed for polymerizing ethylene into a fibrous gel at different temperatures. The specific reaction conditions are set forth in Table 4, below, and show a tendency for gel formation to occur more readily at higher temperatures, i.e. above about 50° C. While optimum gel formation is obtained at the higher temperatures, gel formation may occur at lower temperatures as is seen in run 3 of Table 3, runs 1 and 2 of Table 5, and runs 2, 3, 5 and 6 of Table 6. Reference is also made to FIG. 6 of the drawings which illustrates optimum gel formation for the conditions specified therein at a temperature between about 65–105° C.

TABLE 4.—DIFFERENT TEMPERATURES

| Run number | 1 | 2 | 3 | 4 | 5 | 6 |
|---|---|---|---|---|---|---|
| Polymerization conditions: | | | | | | |
| Catalyst | 1 | 1 | 1 | 1 | 1 | 1. |
| Catalyst concentration (millimoles/liter) | 0.05 | 0.3 | 0.3 | 0.3 | 0.05 | 0.1. |
| Al/V | 3:1 | 3:1 | 3:1 | 3:1 | 3:1 | 3:1 |
| Solvent | c-Hex | c-Hex | c-Hex | Tol | c-Hex | c-Hex. |
| Temperature, °C | 10 | 15 | 30 | 48 | 60 | 76. |
| Mixer, r.p.m.×10⁻³ | 1.4 | 1.4 | 1.4 | 1.4 | 1.4 | 1.4. |
| Sol parameter $(\delta_s)$ | 8.4 | 8.3 | 8.1 | 8.6 | 7.7 | 7.5. |
| $(\delta_s-\delta_p)^2$ (cal./cc.) | 0.003 | 0.0001 | 0.01 | 0.21 | 0.12 | 0.22. |
| Reaction rate (sec.⁻¹) | 26.1 | 23.6 | 8.9 | 14.9 | 38.6 | 18.0. |
| Polyethylene: | | | | | | |
| Polymer yield (grams) | 25.0 | 136.0 | 51.5 | 86.0 | 37.0 | 34.5. |
| Molecular weight×10⁻⁶ (not corrected for shear) | 1.4 | 7.4 | 2.9 | 7.0 | | |
| Description of product | Free fibers | Free fibers | Long free fibers. | Free fibers | Gel ᶜ | Gel.ᶜ |
| Surface area, m.²/g | 25.4 | 18.3 | 21.4 | 15.6 | 33.7 | 3.9. |
| TAPPI opacity, handsheet | | 92.0 | 91.5 | | 94.0 | |
| Scattering coefficient | | | | | 1,180 | |
| Density, g./cc. | 0.926 | 0.926 | 0.928 | 0.926 | 0.934 | 0.935. |
| $M_v \times 10^{-6}$ (corrected for shear) | 7.67 | 6.0 | 2.79 | 7.7 | 6.4 | 2.97. |
| $(\eta)$ dl./g. (corrected for shear) | 27.9 | 23.8 | 14.2 | 28.0 | 24.3 | 14.7. |
| $T_m$ °C | | 133 | | 134 | 134 | |
| Percent crystallinity | | 72 | | 66 | 82 | |

ᵃ NOTE.—See footnote c at end of Table 1.

Different Reaction Rates

The apparatus illustrated in FIG. 1 and the general procedure associated therewith were employed in polymerizing ethylene at the conditions specified in Table 5, below. It is seen from the table that at lower reaction rates crumb is obtained, rather than a fibrous gel.

TABLE 5

| Run number | 1 | 2 | 3 |
|---|---|---|---|
| Catalyst | 1 | 1 | 1 |
| Catalyst concentration (millimoles/liter) | 1.0 | 0.5 | 0.5 |
| Al/V | 3:1 | 3:1 | 3:1 |
| Solvent | c-Hex | c-Hex | c-Hex |
| Temperature, °C | 29 | 40 | 55 |
| Mixer velocity (cm./sec.) | 190 | 157 | 500 |
| Shear stress, lb. (f.)/ft.$^2$ | 0.002 | 0.0014 | 0.0034 |
| Viscosity, centipoises | 0.81 | 0.68 | 0.54 |
| Sol parameter ($\delta_s$) | 8.1 | 8.04 | 7.82 |
| $(\delta_s-\delta_p)^2$ (cal.l/cc.) | 0.009 | 0.03 | 0.09 |
| Reaction rate (sec.$^{-1}$) | 0.7 | 1.0 | 1.3 |
| Polymer yield (grams) | 2.6 | 0.8 | 0.9 |
| Percent PE in gel | | 4.0 | 7.7 |
| Surface area, m.$^2$/g | 9.3 | 50.1 | 33.1 |
| TAPPI opacity, handsheet | | 97.5 | 86.7 |
| Scattering coefficient | | | |
| Density, g./cc | 0.937 | 0.950 | 0.948 |
| $M_v \times 10^{-6}$ (corrected for shear) | 0.85 | 1.2 | 1.46 |
| $(\eta)$dl./g. (corrected for shear) | 6.37 | 8.17 | 9.2 |
| Molecular weight$\times 10^{-6}$ (not corrected for shear) | | 1.2 | 1.3 |
| Description of product | Crumb | Gel [a] | Gel [b] |
| $T_m$, °C | 126 | 130 | 130 |

NOTE.—See footnotes a and b at end of Table 1.

EXAMPLE 6

Different Degrees of Shear Stress During Gel Formation

The apparatus illustrated in FIG. 1 and the general procedure associated therewith previously described were employed for polymerizing ethylene under different degrees of shear stress during gel formation. It is seen by reference to Table 6, below, that fibrous gels were formed at various degrees of shear stress (including no shear stress) up to about 0.01 lbs. (f)/sq. ft. (run 6). Between about 0.01 (run 6) and 0.024 (runs 7 and 8), a transitional phase is illustrated where a swollen fiber aggregate is obtained. When the shear stress reached 0.62 lbs. (f)/sq. ft. (run 9), the shear stress was sufficient to cause nascent polyolefin fiber formation, rather than a fibrous gel. In run 12 the solvent was changed to Drakeol 19 (a white mineral oil manufactured by Pennsylvania Refining Co.) because of its heavier viscosity, thereby enabling a greater shear stress to be imparted to the reaction mass.

EXAMPLE 7

Refining the Fibrous Gel Into Fibers

A fibrous polyethylene gel was prepared in the apparatus illustrated in FIG. 2. The rotor employed was a 4-inch diameter 3 blade standard propeller, rotated at a peripheral velocity of 186 cm./sec. One and one-half gallons of cyclohexane were presaturated with ethylene at reaction temperature (82° C.) Triethyl aluminum was added first to the reaction medium, followed by addition of vanadium oxytrichloride for a catalyst concentration of 0.10 millimoles per liter and an Al:V ratio of 6:1. After 10 minutes, ethanol was injected to kill the reaction. The apparent specific reaction rate was calculated to be 9.54 (sec.$^{-1}$). The yield of gel was 91.1 grams and the viscosity average molecular weight was $3.08\times10^{-6}$ (($\eta$)=15.1 dl./g.). The polymer density was 0.96 g./cc.

Figure 3:
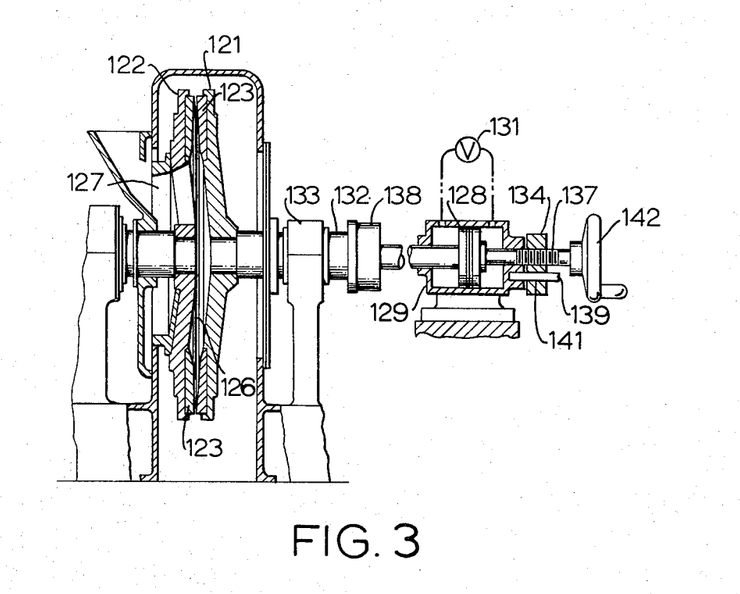
FIG. 3 is a schematic view, partially in section, illustrating one form of commercial pulp refiner suitable for refining the fibrous gel of the present process into discrete fibers.

The apparatus employed for carrying out the refining of the gel into polyethylene fibers is that illustrated in FIG. 3 and known in the papermaking art as a disc refiner. One suitable type is manufactured by Sprout-Waldron. Other types of disc refiners such as those manufactured by Bauer Brothers may also be employed; this latter disc refiner is described in U.S. Pats. 2,214,707 and 2,568,783.

Figure 4:
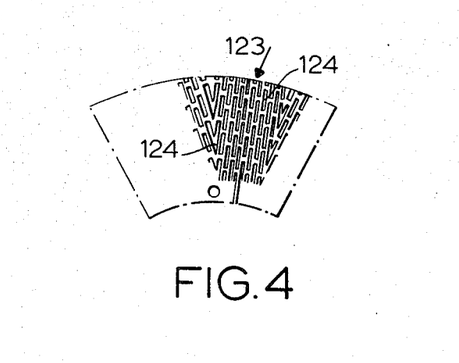
FIG. 4 is a fragmentary plan view of a conventional refining plate section employed in the refiner of FIG. 3 (the dotted lines in the view indicating the complete plate section)

In general, the disc refiner comprises a pair of refining discs 121 and 122 carrying removably mounted roughened surface refining plate sections 123 as shown in FIG. 4; the roughened surface is formed by ribs 124. The rib

TABLE 6.—DIFFERENT DEGREES OF SHEAR STRESS DURING GEL FORMATION

| Run Number | 1 | 2 | 3 | 4 | 5 | 6 | 7 | 8 | 9 | 910 | 11 | 12 | 13 |
|---|---|---|---|---|---|---|---|---|---|---|---|---|---|
| Polymerization conditions: | | | | | | | | | | | | | |
| Catalyst | 1 | 1 | 1 | 1 | 1 | 1 | 2 | 2 | 2 | | 2 | 1 | 2 |
| Catalyst concentration (millimoles/liter) | 0.05 | 0.5 | 0.1 | 0.5 | 0.5 | 0.1 | 0.15 | 0.15 | 0.15 | 5.0 | 0.15 | 0.5 | 0.15 |
| Al/V | 3:1 | 3:1 | 3:1 | 3:1 | 3:1 | 3:1 | 40:1 | 40:1 | 40:1 | 3:1 | 40:1 | 3:1 | 40:1 |
| Solvent | c-Hex | c-Hex | c-Hex | c-Hex | c-Hex | c-Hex | c-Hex | c-Hex | c-Hex | Decalin | c-Hex | Drakeol 19 | c-Hex |
| Temperature, °C | 12 | 40 | 28 | 55 | 14 | 37 | 64 | 65 | 51 | 56 | 61 | 55 | 63 |
| Mixer velocity (cm./sec.) | 0 | 157 | 195 | 500 | 590 | 1,145 | 1,437 | 2,850 | 167 | 1,330 | 322 | 2,688 | 3–5 |
| Shear stress, lb. (f.)/ft.$^2$ | 0 | 0.0014 | 0.002 | 0.0043 | 0.0080 | 0.01010 | 0.013 | 0.017 | 0.60 | 1.44 | 0.58 | 0.62 | 0.65 |
| Viscosity, centipoises | 1.17 | 0.68 | 0.8 | 0.54 | 1.07 | 0.715 | 0.5 | 0.5 | 7.88 | 8.29 | 0.5 | 18.4 | 0.5 |
| Sol parameter ($\delta_s$) | 8.4 | 8.04 | 8.3 | 7.82 | 8.41 | 8.0 | 7.7 | 7.7 | 0.07 | 0.07 | 7.7 | 6.6 | 7.7 |
| $(\delta_s-\delta_p)^2$ (cal./cc.) | 0.002 | 0.009 | 0.008 | 0.09 | 0.025 | 0.013 | 0.13 | 0.14 | 12.0 | | 0.13 | | 0.13 |
| Reaction rate (sec.$^{-1}$) | 2.2 | 1.0 | 3.0 | 1.3 | 1.5 | 0.5 | 8.0 | 3.2 | | | 9.0 | | 9.7 |
| Polyethylene: | | | | | | | | | | | | | |
| Polymer yield (grams) | 8.4 | 0.8 | 1.2 | 0.8 | 1.7 | 4.2 | 3.5 | 0.8 | 4.4 | 5.6 | 3.4 | 23.5 | 1.5 |
| Molecular weight$\times 10^{-6}$ | 1.2 | 1.2 | | 1.3 | 1.6 | | | 1.6 | | 4.2 | | 1.9 | |
| Crystallinity (percent) | 76 | 80 | 80 | 130 | 132 | | | 131 | | 80 | | | |
| Melting point, °C | 133 | 136 | 136 | 130 | | | | | | 136 | | | |
| Description of product | Gel [a] | Gel [a] | Gel [b] | Gel [b] | Gel [b] | Gel [c] | Gel [c] | Swollen fiber aggreg. | Gel [c] | Swollen fiber aggreg. | Swollen fiber aggreg. | Nascent fibers | Gel [c] |
| Percent PE in gel | 37.1 | 4.0 | 2.2 | 7.7 | 9.6 | | 8.4 | 9.0 | 10.0 | 16.0 | | 6 | 9.0 |
| Surface area, m.$^2$/g | | 50.1 | | 33.1 | 45.9 | 19.4 | | 37.6 | 31.4 | 28.6 | | | |
| TAPPI opacity, handsheet | | 97.5 | | 86.7 | 89 | | | 88.6 | 84.9 | | 97.5 | | |
| Scattering coefficient | | | | | | | | 736 | 667 | 575 | | 98 | |
| Density, g./cc | 0.935 | 0.950 | | 0.948 | 0.934 | 0.933 | | 0.944 | | | | 942 | |
| $M_v \times 10^{-4}$ (corrected for shear) | 3.49 | 1.2 | 1.3 | 1.46 | 1.6 | 3.55 | | 1.6 | 2.6 | 0.937 | | 2,011 | |
| $(\eta)$dl./g. (corrected for shear) | 16.44 | 8.17 | 8.7 | 9.2 | 9.77 | 16.6 | | 9.61 | 13.5 | 4.2 | 0.93 | 97.5 | |
| | | | | | | | | | | 18.5 | 6.8 | | |

NOTE.—See footnotes a, b, and c at end of Table 1.

pattern shown in FIG. 4 is one of many different patterns that are available and is merely shown for purposes of illustration. The working space 126 between the discs is usually tapered toward the periphery. Ordinarily, fibrous gel is introduced by any suitable means into the working space 126 through inlet 127, adjacent to the axis of rotation of the discs. Either one or both of the discs may be rotatable, and where they are both rotatable they usually rotate in opposite directions. In this example, the disc designated 121 was fixed and disc 122 rotated by virtue of the motor means partially illustrated. Disc 121 is yieldably mounted to permit adjustment of the working space between the discs by means of hydraulic piston 128, which is slidable into cylinder 129 and controlled by hydraulic control mechanism 131. The piston 128 is connected to a rod 132, slidable in bearing 133 and attached to disc 121. The limit of movement of yieldable disc 121 toward disc 122 is controlled by a stop nut 134 threaded on spindle 137, having a swivel connection at 138 with rod 132. Nut 134 is prevented from turning by means of a pin 139 projecting through an aperture 141 in the nut. By turning hand wheel 142, secured to spindle 137, the relative axial position of nut 134 with respect to spindle 137 can be adjusted to limit the forward movement of disc 121 and thus provide control for the spacing between discs 121 and 122.

In the present example the disc refiner employed was manufactured by Sprout Waldron, the discs were 10" in diameter and bar type plates #17805 were used. These plates have a herringbone design. Valleys in the design were 3/16" wide, the raised areas 1/8" wide, and 1/8" high.

The fibrous gel slurry was preliminarily treated for 15 seconds with a Waring blendor to break up the large gel mass into smaller gel pieces and then passed through the disc refiner three times. The refiner was operated at 900" per minute with clearances between the plates of 0.1" for the first time, 0.01" for the second, and 0.005" for the third. The material was then collected on a filter and redispersed in 10 liters of water, together with 2.5 milliliters of wetting agent (Zonyl A) and 5 milliliters concentrated hydrochloric acid, to a consistency of 0.25% (by weight). The thusly prepared fiber slurry was passed through the disc refiner as mentioned and collected on a 200 mesh screen.

The fibers obtained from the disc refining were screened through five 10-inch Tyler screens. The screens were stacked with the coarsest screen on top and the finest at the bottom. Ten grams of fiber from the disc refiner were dispersed in one liter of water and placed into the top screen. Water was then sprayed at a rate of 1200 milliliters per minute for a total time of 10 minutes. During this time the screen stack was shaken back and forth with a one-inch stroke. The results are set forth in Table 7, below.

TABLE 7

Fiber Size After Refining Fibrous Gel

| Screen Size: | Fiber Portion Retained (Percent) |
|---|---|
| 14 mesh | 16 |
| 20 mesh | 21 |
| 35 mesh | 45 |
| 65 mesh | 13 |
| 150 mesh | 1 |
| Through 150 mesh | 4 |

The foregoing distribution of fiber size is quite similar to the fiber size distribution that would be obtained with cellulosic fibers employed for papermaking. The surface area was 7.4 m.²/g.

EXAMPLE 8

Refining Fibrous Gel With a Dyna Pulper

The Dyna pulper is not illustrated in the drawings but is a regular, conventional type of papermaking equipment. It consists of a horizontally arranged cylindrical stainless steel vessel with a diameter of 10". The ends of the cylinder are slightly conical. Inside this cylinder are two discs arranged parallel to each other and 10" apart. The sides of these discs facing each other are studded with steel teeth of various sizes up to 3/8" high. During operation, the two discs counter-rotate to each other at 2,000 r.p.m.

The fibrous gel prepared in accordance with run 1 of Example 3 was charged to the Dyna pulper in the form of three pieces of gel having a total weight of 80 grams. Refining was done in 8 liters of cyclohexane and the gel was exposed to the rotating discs for 20 minutes.

Bundles of fibers up to 2" long were obtained. The thickness of the bundles ranged from very thin bundles of only a very few fibers to bundles 0.125" thick. Such bundles would be further refined by conventional techniques to separate the individual fibers from the bundles (defibering) prior to using the fibers for textile applications or for non-woven webs, as in papermaking.

EXAMPLE 9

Reaction Time

Ethylene was polymerized at various temperatures in the reactor illustrated in FIG. 2 except that agitation was effected with a single 3-blade rotor mounted on the shaft about 4 inches from the bottom. The rotor was operated at 350 r.p.m. The solvent was Phillips 85% grade cyclohexane for the runs at 125° F., and Phillips pure-grade cyclohexane for all other runs. The solvent was predried with a Linde 4A mol-sieve. The solvent was saturated with ethylene at reaction temperature and pressure prior to reaction initiation, and no ethylene was added after initiation of polymerization. The co-catalyst, triethyl aluminum, was added in excess to the reactor (at 0.6 gram-millimole/ liter) to destroy any residual water in the system. The catalyst vanadium oxytrichloride, was then immediately added at 0.1 gram-millimole/liter. Reactor temperature was maintained for the 125° F. and 180° F. runs by circulating hot water of proper temperature through the reactor jacket. Pressurized steam was circulated for the 250° F. runs. Reaction time was that period between injection of vanadium oxytrichloride into the reactor to initiate the polymerization and the injection of ethanol to kill the reaction. Yield of fibrous gel was determined, and the results were plotted as illustrated in FIG. 5, with curve A being the 125° F. runs, curve B being the 180° F. runs, and curve C being the 250° F. runs. As discussed previously, these curves show that polymerization was essentially complete at the end of 2-4 minutes, indicating a relatively rapid reaction rate.

EXAMPLE 10

Polypropylene Fibers

Propylene was polymerized in the reactor of FIG. 2 to form a fibrous gel. Three rotors having no pitch were employed for agitation and operated at 1400 r.p.m. One gallon of cyclohexane was introduced into the reactor and saturated with propylene at 60° C., and excess propylene passed through the reactor to maintain a pressure of 30 p.s.i. thereon. Diethyl aluminum chloride was added first to the reactor at a concentration of 1.5 millimole/liter, followed by the addition of 1.0 millimole/liter of vanadium oxytrichloride and, finally, 1.5 millimole/liter of triethyl aluminum, for a total ratio of Al:V of 3:1.

The reaction was continued for ten minutes and then terminated by addition of isopropyl alcohol. The solubility parameter of cyclohexane at the reaction temperature is 7.75, and $(\delta_s - \delta_p)^2$ is 0.0032 cal./cc. Fibrous polypropylene gel was obtained, and refined in a Waring blendor at high speed. Polypropylene fibers were obtained.

The polypropylene fibers had a surface area of 4.3 m.²/g. The viscosity average molecular weight of the fibers was 90,000 $((\eta) = 0.9$ dl./g.).

EXAMPLE 11

Higher Pressure Runs

For producing polyolefin fibers at higher pressures, a steam jacketed, batch autoclave reactor of approximately one gallon capacity (Benco Model 575 RJ having a ¼ horsepower variable speed type R drive) was employed. The warmed autoclave is purged for about 4 hours with nitrogen, and one gallon of cyclohexane (purified by running it through a molecular sieve column) introduced using nitrogen pressure to force it from the reservoir into the reactor. Steam was introduced into the jacket of the autoclave to bring the cyclohexane up to reaction temperature. Ethylene gas was then introduced to the reactor with a slight amount of venting through the relief valve to provide a small ethylene purge. The stirrer (a curved blade turbine having 6 blades 3 inches in diameter and a blade height of ⅜ inch) was operated at 1500 r.p.m. Ethylene introduction was continued until the pressure in the reactor remained constant, indicating saturation of the cyclohexane. The relief valve and ethylene inlet line were then closed. About 10 cc. of cocatalyst (triethyl aluminum) dissolved in cyclohexane was introduced into a reservoir having a rubber septum via hyperdermic syringe, and from the reservoir through a remotely controlled diaphragm operated needle valve into the reactor by nitrogen pressure slightly higher (about 100 p.s.i.) than the pressure in the reactor. After about 30 seconds mixing about 10 cc. of the catalyst (vanadium oxytrichloride) dissolved in cyclohexane was introduced into the reactor in a similar manner. The ratio of cocatalyst to catalyst (TEAL/VOCl₃) was 6/1. The introduction of the catalyst marks the beginning of the polymerization reaction. The reaction was terminated by injecting a catalyst poison (isopropanol) into the reactor in the same manner as the introduction of catalyst and cocatalyst. The steam was then turned off and cooling water (about 55° F.) circulated in the jacket. After the reactor had cooled to about room temperature, the relief valve was opened and excess pressure relieved. The fibrous gel product was then removed from the reactor. The results are as follows:

TABLE 8.—HIGHER PRESSURE POLYMERIZATION

| Run number | 1 | 2 |
|---|---|---|
| Polymerization conditions: | | |
| Initial pressure, atmospheres | 20 | 37 |
| Initial temperature, °C | 55 | 53 |
| VOCl₃ (g. mmole/liter) | 0.026 | 0.026 |
| Reaction time (minutes) | 5 | 8 |
| Maximum temperature (°C.) | 125 | 56 |
| Reaction rate (sec.⁻¹)* | 219 | 9.9 |
| Polyethylene properties: | | |
| Yield (g.) | 183 | 13.5 |
| Yield (g. PE/g. VOCl₃) | 10,600 | 780 |
| $M_v \times 10^{-6}$ | 6.8 | 20.5 |
| Handsheet properties: | | |
| Breaking length, meters | 385 | |
| Tear factor | 68 | |
| Rupture energy, ergs./cm.² | 0.7×10⁴ | |
| Scattering coefficient | **234 | |

\* Calculated in the manner previously described for reactor of FIG. 2.
\*\* Average of two handsheets tested.

The fibers produced by the process of the present invention may be employed for those uses to which fibers are normally employed. The principal utility is in the areas of forming nonwoven webs and in textile applications by spinning yarn from the fibers. Other uses include molding, insulation, coatings, laminate reinforcement and filter manufacture.

What is claimed is:

1. A process of preparing fibers of polyolefins comprising polymerizing an olefin in the presence of a coordination catalyst system in a reaction medium whose solubility parameter is such that $(\delta_s - \delta_p)^2$ is less than about 3.0 cal./cc. and at a temperature less than the melt dissolution temperature of the polyolefin to be formed, and subjecting said polymerization solution to a positive shear stress of greater than about zero pound (force)/square foot up to about 0.1 pound (force)/square foot during polymerization, the magnitude of said shear stress being sufficiently great to precipitate the polyolefin as a fibrous gel having a fibrillar structure of fibrous polyolefin in which the interconnecting capillary spaces are filled with reaction medium, said magnitude of shear stress being less than that amount which would cause the direct formation of a substantial amount of discrete fibers directly recoverable without requiring further processing steps, and subsequently subjecting said fibrous gel formed during polymerization to a shear stress of greater than about 0.1 pound (force)/square foot, thereby producing discrete, directly recoverable, polyolefin fibers without requiring further processing steps.

2. The process of claim 1, wherein the apparent specific reaction rate is greater than about 0.05 (sec.⁻¹) and is effectively high enough for the temperature and reaction medium employed to form a fibrous gel.

3. The process of claim 2, wherein the apparent specific reaction rate is greater than about 0.05 to 0.1 (sec.⁻¹) where the temperature is near the melt dissolution temperature of the polyolefin, is greater than about 0.4 (sec.⁻¹) where the temperature is less than about 60° C., and is greater than about 0.55 (sec.⁻¹) where the temperature is less than about 30° C.

4. The process of claim 1, wherein the olefin is selected from the group consisting of ethylene, propylene and mixtures thereof.

5. The process of claim 1, wherein the reaction medium is a composition selected from the group consisting of cyclohexane, decalin, heptane, tetralin, m, o and p-xylene, chlorinated solvents, toluene, hexane, isooctane, mineral oils, n-octane, p-cymene and mixtures thereof.

6. The process of claim 1, wherein the coordination catalyst is of the Ziegler type.

7. The process of claim 6, wherein the Ziegler type catalyst comprises a catalyst selected from the group consisting of titanium trichloride, titanium tetrachloride, vanadium tetrachloride and vanadium oxytrichloride, and co-catalyst selected from the group consisting of diethyl aluminum chloride and triethyl aluminum.

8. The process of claim 1, wherein an excess of olefin is employed.

9. The process of claim 1, wherein the olefin is gaseous and the reaction medium is saturated with the olefin prior to introduction of the catalyst.

10. The process of claim 1, wherein the reaction rate is sufficiently rapid that the polymerization is substantially complete within about 1 to about 30 minutes of catalyst addition.

11. The process of claim 1, wherein the polymerization is carried out under conditions to provide a polyolefin having a viscosity average molecular weight in excess of about 40,000.

12. The process of claim 1, wherein the polymerization is carried out in the absence of chain transfer agents to provide a polyolefin having an essentially zero melt index.

13. A fibrous gel of a polyolefin comprising a fibrillar structure of fibrous polyolefin in the form of microfibrils, macrofibrils and fibers and having interconnecting capillary spaces filled with a solvent whose solubility parameter is such that $(\delta_s - \delta_p)^2$ is less than about 3.0 cal./cc., said fibrous gel being substantially free of discrete polyolefin fibers directly recoverable without requiring further process steps, and said polyolefin being present in an amount of from about 0.5% up to about 50% by weight of the fibrous gel.

14. The fibrous gel of claim 13, wherein the amount of polyolefin present is from about 3.0% up to about 30% by weight.

15. The fibrous gel of claim 13, wherein the polyolefin has a viscosity average molecular weight greater than about 40,000.

16. The fibrous gel of claim 13, wherein the polyolefin has an essentially zero melt index.

17. The fibrous gel of claim 13, wherein the fibrillar structure of the fibrous polyolefin is essentially in the form of macrofibrils and fibers.

References Cited

UNITED STATES PATENTS

| | | | |
|---|---|---|---|
| 3,743,272 | 7/1973 | Nowotny et al. | 260—94.9 GD |
| 3,574,138 | 4/1971 | Ziegler et al. | 260—94.9 B |
| 3,055,880 | 9/1962 | Raecke | 260—94.9 B |

OTHER REFERENCES

Keller and Willmouth, Die Makromolekulare Chemie, 121, pp. 42–50 (1969).

JOSEPH L. SCHOFER, Primary Examiner

A. HOLLER, Assistant Examiner

U.S. Cl. X.R.

260—88.2 B, 93.7, 94.9 F, 94.9 GD